(12) United States Patent
Saitoh

(10) Patent No.: US 7,341,789 B2
(45) Date of Patent: Mar. 11, 2008

(54) STAIN RESISTANT PROTECTIVE FILM AND ADHESIVE SHEET HAVING THE SAME THEREON

(75) Inventor: Tsuneyoshi Saitoh, Higashine (JP)

(73) Assignee: 3M Innovative Properties Company, St. Paul, MN (US)

( * ) Notice: Subject to any disclaimer, the term of this patent is extended or adjusted under 35 U.S.C. 154(b) by 33 days.

(21) Appl. No.: 10/486,253

(22) PCT Filed: Jul. 25, 2002

(86) PCT No.: PCT/US02/23856

§ 371 (c)(1),
(2), (4) Date: Feb. 4, 2004

(87) PCT Pub. No.: WO03/013850

PCT Pub. Date: Feb. 20, 2003

(65) Prior Publication Data

US 2004/0191527 A1  Sep. 30, 2004

(30) Foreign Application Priority Data

Aug. 10, 2001 (JP) .............................. 2001-243985
Aug. 10, 2001 (JP) .............................. 2001-244001

(51) Int. Cl.
*B32B 27/18* (2006.01)
*B32B 9/04* (2006.01)

(52) U.S. Cl. .................. 428/447; 428/411.1; 428/421; 428/446

(58) Field of Classification Search ................. 428/447
See application file for complete search history.

(56) References Cited

U.S. PATENT DOCUMENTS

| 5,346,755 A | * | 9/1994 | Morse ........................ 428/519 |
| 2001/0008696 A1 | * | 7/2001 | Takahama et al. .......... 428/446 |
| 2003/0044600 A1 | * | 3/2003 | Okuyama ................... 428/343 |

FOREIGN PATENT DOCUMENTS

| BE | 1004521 | | 12/1992 |
| EP | 0 653 456 A | | 5/1995 |
| EP | 0 671 448 A | | 9/1995 |
| EP | 1 232 223 B1 | | 11/2003 |
| JP | HEI 8-337771 | | 12/1996 |
| JP | HEI 9-302257 | | 11/1997 |
| JP | 11267585 | * | 10/1999 |
| JP | HEI 11-267585 | | 10/1999 |
| WO | WO01/18139 | * | 3/2001 |

* cited by examiner

*Primary Examiner*—Randy Gulakowski
*Assistant Examiner*—Timothy J. Kugel
(74) *Attorney, Agent, or Firm*—Colene H. Blank

(57) ABSTRACT

The present invention is to provide a stain resistant film that shows excellent stain resistance in a long period of time immediate after forming the film, which exhibits stain resistance in initial use (within one month after forming the film) and keeps the resistance from reduction thereof with time. A stain resistant protective film comprising (a) a base layer formed from a film-forming resin and containing a hydrophilic stain resistant agent therein, and (b) a-surface layer containing another hydrophilic stain resistant agent at least, remaining on the periphery of the surface, formed on the base layer (a).

17 Claims, 1 Drawing Sheet

STAIN RESISTANT PROTECTIVE FILM AND ADHESIVE SHEET HAVING THE SAME THEREON

FIELD OF THE INVENTION

The present invention relates to a stain resistant protective film and an adhesive sheet having the stain resistant protective layer on one surface. The adhesive sheet can be applied to an object to be used outside, such as a wall or window of a building, a body of a vehicle, plane or ship to protect the object from stain, dirt or the like.

BACKGROUND OF THE INVENTION

Articles used outside have a protective film or adhesive sheet having such protective film layer on surfaces, in order to protect the surfaces from many stains and to keep appearance good. The protective film has generally been formed from synthetic resin having water repellent function or material containing fluorine-containing substance or silicon-containing substance for enhancing water repellent properties. However, it has been reported that the materials having water repellent function have the following defects:

(1) In case of hydrophilic stain substances, such as dirt, sand dust, dust or the like, the protective film has water repellency on the surface and water easily falls down as water drops from the surface. Some water drops, however, remain on the surface without falling down and are dried up thereon to form dryup marks, which attract stain substance and form dot-shape stains. It is also very difficult to remove the stains once remaining on the surface by natural cleaning function, such as rain, because of hydrophilic nature of such stains.

(2) In case of lipophilic stain substances, such as exhausted gas, smoke dust or the like, the protective film has relatively high lipophilic nature and easily attracts lipophilic stain substances.

In order to improve the above defects, it has been recently proposed that the surfaces are made not lipophilic but hydrophilic, that is lowering water contact angle. The hydrophilic surface allows hydrophilic stain substances to easily adhere thereon, but the substances are removed away by natural cleaning function, such as rain. The lipophilic stain substances keep away from the surface, because they are difficult to adhere onto the hydrophilic surface.

As explained above, the mechanism of hydrophilic surface is very clear and reasonable, but it is not so easy to make the protective surface hydrophilic. The protective film is generally formed from synthetic polymeric material that is not hydrophilic but lipophilic, as general. The synthetic polymeric material is made hydrophilic by introducing hydrophilic groups into polymer molecules, but if a coating formed from the synthetic material is hydrophilic as a whole, the coating itself shows poor durability and poor water resistance. Accordingly, what has presently been proposed and studied as simple and effective method is that an agent having hydrophilic nature or an agent imparting hydrophilic nature (hereafter called as "hydrophilic stain resistant agent" in the present invention) is added in the protective film.

The "hydrophilic stain resistant agent" called herein is acknowledged not as a general surfactant, but as a specific additive. An agent having such surface activity that has been known to the art lowers water resistance or durability of the coatings and deteriorates adhesion with an under layer. The hydrophilic stain resistant agent should be one that does not deteriorate coating performance and merely makes a surface of the coating hydrophilic, which has recently been studied.

For example, Japanese Kokai Publications 2001-89721 and Hei 8 (1996)-337771 disclose specific hydrophilic stain resistant agent, which is formulated into into a resin coating. The hydrophilic stain resistant agent has a relative low molecular weight and bleeds out onto a surface of the coating and is chemically decomposed to produce hydrophilic chemical species, which imparts hydrophilic nature to the coating. The hydrophilic stain resistant agent is locally present on the periphery of the surface after bleeding out and shows excellent stain resistance. The localization of the agent on the surface adversely causes significant reduction of stain resistance when the surface is cut off due to abrasion with time or due to coating operation.

On the other hand, Japanese Kokai Publication Hei 11 (1999)-267585 discloses a protective film in which a hydrophilic stain resistant agent is contained. The protective film is formed from a clear coating composition, which comprises (A) 30 to 90% by weight of a film forming resin, (B) 10 to 70% by weight of a curing agent, and (C) 1 to 50% by weight of the hydrophilic stain resistant agent, percentages being based on non-volatile weight ratio. The stain resistant agent (C) exemplifies organosilicate, organosilicate condense, inorganic oxide sol (e.g. aluminum oxide sol, silicate oxide sol, zirconium oxide sol, antimony oxide sol or the like). The clear coating composition is formed from a combination of a curable resin and an inorganic oxide type stain resistant agent and imparts protective effects, such as stain resistance or weather resistance, to an article coated with the composition.

Another coating composition having similar effects is also proposed in Japanese Kokai Publication Hei 9 (1997)-302257. The inorganic oxide type stain resistant agent, however, is trapped within the resin matrix of the cured resin and does not show sufficient hydrophilic nature, e.g. water contact angle of less than 70 degrees, during initial use (within one month after coating), contrary to the surface bleed type stain resistant agent. In this case, the hydrophilic nature of the coated film would become sufficient after passing a considerable time, especially after about half a year from starting use and enhance stain resistance, but it is difficult to impart stain resistance during the initial use. It is believed that the late revelation of hydrophilic nature is caused by exposure of the stain resistant agent to the surface due to abrasion of the coated resin and the like, or by enhancement of level of hydrophilic nature due to chemical change of the stain resistant agent.

SUMMARY OF THE INVENTION

Accordingly, an object of the present invention is to provide a stain resistant film that shows excellent stain resistance in a long period of time immediate after forming the film, which exhibits stain resistance in the initial use (within one month after forming the film) and keeps the resistance from reduction thereof with time.

The present invention provides a stain resistant protective film comprising (a) a base layer formed from a film-forming resin and containing a hydrophilic stain resistant agent therein, and (b) a surface layer containing another hydrophilic stain resistant agent at least remaining on the periphery of the surface, formed on the base layer (a).

The present invention is to provide a stain resistant protective film that is formed from a film-forming resin and contains two hydrophilic stain resistant agents, of which the first stain resistant agent is an inorganic oxide type hydrophilic stain resistant agent and the second stain resistant agent is a surface-bleed type hydrophilic stain resistant agent.

In another aspect, the present invention also provides a protective film having a two-layer structure, composed of an upper layer and a lower layer. The upper layer (surface layer) keeps the hydrophilic stain resistant agent on the periphery of the surface so as to exhibit stain resistance derived from hydrophilic function immediate after coating or using. The lower layer (base layer) contains the hydrophilic stain resistant agent within the coating resin matrix, in order to show stain resistance derived from hydrophilic function instead of the surface layer, after the surface layer does not show the function by the reason. of abrasion of the surface layer and the like.

In yet another aspect, the present invention provides a protective film containing two hydrophilic stain resistant agents, of which one is a surface-bleeding type hydrophilic stain resistant agent and the other is an inorganic oxide type stain resistant agent. The surface-bleeding type stain resistant agent, after forming the protective film, bleeds out onto surface to make the periphery of the surface hydrophilic, so as to exhibit stain resistance derived from hydrophilic function immediate after coating or using. On the other hand, the inorganic oxide type hydrophilic stain resistant agent remains within the film-forming resin matrix, to show stain resistance derived from hydrophilic function instead of the surface, after the surface does not show the function by the reason of abrasion of the surface layer and the like.

The stain resistant protective film of the present invention is generally formed on one side of a substrate, and the other side of the substrate has an adhesive layer, which functions as an adhesive sheet. The adhesive sheet is adhered on an article to be protected through the adhesive layer, to exhibit protective function for the article.

DETAILED DESCRIPTION OF THE EMBODIMENTS

Figure 1:
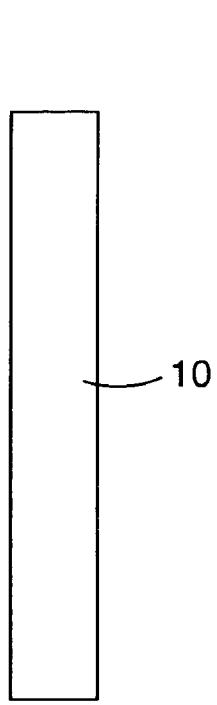
FIG. 1 is a cross sectional schematic diagram of a stain resistant protective film.

The stain resistant protective film has a two-layer structure composed of a base layer and a surface layer. The base layer is formed from a film forming resin and contains a hydrophilic stain resistant agent. Further, the film can contain two hydrophilic stain resistant agents.

The film forming resin can be a resin used for paint and the like, and shows film forming ability. The film forming resin can be either a curable resin forming three-dimensional network structure, or a non-curable resin not forming three-dimensional network structure. It is preferred that the film forming resin is the curable resin, in view of durability of the coated film or the like. The non-curable film forming resin includes acrylic resin, polyester resin, polyurethane resin, polyolefin resin, polyvinyl chloride, silicone resin (including modified silicone, such as silicone polyurea) or the like. The curable resin is one that is known to the art as a resin curable by the function of heat, light or the like, that is, forming three dimensional network structure, for example epoxy resin.

The curable resin can be a combination of the non-curable film forming resin to which reactive groups are introduced, and a curing agent. Curing can be conducted by heat, or light, but other curing systems are usable. Examples of the reactive groups introduced into curable resins are hydroxyl group, carboxyl group, epoxy group, amino group and the like and examples of the curing agent are polyisocyanate compound, epoxy compound, melamine resin and the like.

When the curable resin contains a curing agent, an amount of the curing agent may be within the range of 5 to 60% by weight, 10 to 50% by weight, based on total solid content. The film forming resins before curing or non-curable film forming resin preferably has a number average molecular weight of 10,000 to 500,000, more preferably 15,000 to 30,000, molecular weight being determined by GPC (Gel Permeation Chromatography) calculated in terms of styrene.

The hydrophilic stain resistant agent formulated into the base layer (a) can be any one that has been used, but preferred is inorganic oxide type stain resistant agent that is trapped within the resin matrix of the base layer (a). Further, the hydrophilic stain resistant agent may be a combination of both the inorganic oxide type stain resistant agent and a surface type stain resistant agent. However, since the hydrophilic stain resistant agent for the base layer (a) can be all kinds of such agents that are art-known, including surface bleed type one.

This hydrophilic stain resistant agent is one that is transferred onto the surface of the coatings and has a functional moiety that is changed to hydrophilic moiety by hydrolysis or heat decomposition, for example, organic acid moiety or silane compound moiety, in a molecule. The functional moiety, which can be a decomposable group, preferably is one that is decomposed by light, heat or hydrolysis to produce a hydrophilic group. More preferred is a fluorine-containing protective group or a silicon-containing protective group that is changed to hydrophilic group by hydrolysis, heat or light decomposition. The fluorine-containing protective group generally is removed off from a portion to produce a hydrophilic group after decomposition. The fluorine-containing has a function of enhancing surface bleed ability. The silicon-containing protective group, on the other hand, may be one removing off after decomposition, but preferably be one that produces after decomposition a hydrophilic group having a silicon atom to which a hydroxyl group or oxyhydroxy group is bonded. A molecular weight of this hydrophilic stain resistant agent is not limited as long as it shows surface bleeding ability, but generally has a number average molecular weight of 100 to 9,000, preferably 200 to 6,000.

The preferred surface bleed type hydrophilic stain resistant agent is a compound shown by the following formula:

$$Z\text{-}X\text{—}O\text{—}R_f \qquad [I]$$

wherein Z is an organic group including a hydrocarbon group or a substituted hydrocarbon group, which may contain silicon atom, X is C=O (carbonyl) or $SO_2$, and $R_f$ is a fluorine-substituted hydrocarbon group in which a portion or all of the hydrogen atoms is changed with fluorine atom, and may also contain an oxygen atom.

The compound is excited by heat or light and decomposed at a bond between oxygen and $R_f$ in the above formula. This decomposition produces a hydrophilic group (X—O in the formula), such as a carboxylic group or sulfonic acid group, which effectively enhances the hydrophilic nature on the surface of the protective layer.

In formula I of the hydrophilic stain resistant agent, the $R_f$ group can also be an organic group that does not contain fluorine atom. The hydrophilic stain resistant agent can also be an organic silicone compound as shown in the following formula II:

$$Y-O-R_f \qquad [II]$$

wherein Y is a silicon-containing functional group, such as siloxane group, silylene group, silane compound moiety, silicate moiety and the like, which is hydrolized to produce hydrophilic chemical species, and $R_f$ is the same as the formula I.

Surface bleed type hydrophilic stain resistant agents as mentioned above are commercially available, including a fluorine-containing polysiloxane available from Daikin Industries, Ltd. as GH-100 or GH-700, a fluorine-containing organic silan compound available from Toagosei Chemical Industry Co., Ltd. As ZAFLON FC-2250™ (containing both fluorine resin unit and organic silan unit), silicone oligomer available from Shin-Etsu Chemical Co., Ltd. as X-41-1053 (containing both organic group containing methoxy group and alkoxysilane group), and the like.

The first hydrophilic stain resistant agent can be inorganic oxide type and includes (i) silicate oxide-containing compound, such as organosilicate compound (organosilicate, organosilicate condense etc.), (ii) inorganic oxide sol, such as silan oxide sol, aluminum oxide sol, zirconium oxide sol, and antimony oxide sol; and the like. Preferred compounds for the above hydrophilic stain resistant agent are, described in Japanese Kokai Publication-Hei 9 (1998)-302257 and Hei 11 (1999)-267585.

The referred inorganic oxide type stain resistant agent is organosilicate compound. The organosilicate compound is used in the form of, for example, inorganic oxide sol (e.g. silica sol) on which silan coupling agent (silan oxide type surface treating agent) is carried; or silica sol on which organic polymer is covered; or the like. The sol preferably has an average particle size of not more than 100 nm.

According to the present invention, the base layer (a) is formed by coating a base layer composition that comprises a film forming resin and a hydrophilic stain resistant agent. Optionally, the stain resistant protective film is formed by coating a protective film composition that comprises a film forming resin and two hydrophilic stain resistant agents. The base layer composition may further contain a curing agent, and an additive if necessary. The hydrophilic stain resistant agent may be contained in an amount of 10 to 100 parts by weight, preferably 15 to 90 parts by weight, more preferably 20 to 80 parts by weight, based on 100 parts by weight of the film forming resin. If two hydrophilic stain resistant agents are used the combination of the 1 to 70 parts by weight, preferably 3 to 60 parts by weight, more preferably 5 to 50 parts by weight, based on 100 parts by weight of the film forming resin. If the amount of the agent is too low, the protective film does not have sufficient hydrophilic nature and lowers protective performance, such as stain resistance. If it is too much, the film performance and adhesive power with the substrate present thereunder may be deteriorated.

The surface-bleed type stain resistant agent may preferably contain in the base layer composition film in an amount of 0.3 to 30 part by weight, preferably 0.5 to 20 parts by weight, more preferably 1 to 10 parts by weight, based on 100 parts by weight of the film-forming resin. If the surface-bleed type stain resistant agent is less than the lower limit, the protective film does not have sufficient hydrophilic nature and does not prevent initial stain. If it is more than the upper limit, a layer is formed on the surface from the organic protective group of the surface-bleed type stain resistant agent and hydrophilic nature would be deteriorated. In addition, an amount of the inorganic oxide type hydrophilic stain resistant agent is lowered and the long-term stain resistance does not maintain.

The resulting base layer composition (coating composition) may preferably be coated on a surface of a substrate, and dried or cured to, form a coating (base layer (a)). The curing condition is not limited, but generally is at a temperature of 80 to 150° C. for a period of 1 to 20 minutes.

According to the present invention, a surface layer (b) containing another hydrophilic stain resistant agent is then coated on the base layer (a) obtained above. The surface layer (b) may be formed from a composition containing a film forming resin and a hydrophilic stain resistant agent, similar to the base layer (a), but the film forming resin may be either present in a small amount or absent for the surface layer (b). Since the presence of the film forming resin is generally functioned as negative regarding hydrophilic nature, the film forming resin is used in a relatively small amount in the surface layer (b), because the surface layer (b) does not need film performance by the presence of the base layer (a). In addition, since it is required that the surface layer (b) is formed for keeping or making sure the hydrophilic performance in initial use (within one month after forming the film) or initial period after forming, it is preferred that the hydrophilic ability of the surface layer (b) is kept until the base layer (a) exhibits hydrophilic ability after passing some time. The surface layer (b) therefore can be one that is thin and easily abraded and may be formed by coating a paint obtained by dissolving or dispersing the hydrophilic stain resistant agent in a solvent. Suitable paint for the surface layer (b) includes a paint containing organic silicon compound-type stain resistant agent (OX-011) available from Nippon Oil & Fat Co. Ltd.

The film forming resin and the hydrophilic stain resistant agent for the surface layer (b) can be one that is used for the base layer (a), but the hydrophilic nature should be present in the initial use and therefore the hydrophilic stain resistant agent is preferably the surface bleed type as explained above. Although the coating method and formulation amounts are not different from the base layer (a), the hydrophilic stain resistant agent may preferably be present in an amount of 50 to 100% by weight, more preferably not less than 60% by weight based on a total weight of the surface layer (b), as there is an embodiment in which no film forming resin is used.

In case where the base layer (a) contains the inorganic oxide type hydrophilic stain resistant agent and the surface layer contains the surface bleed type hydrophilic stain resistant agent, the surface layer (b) is coated and dried by heat to generate some defect, called cloud, thus the transparency of the protective film being often deteriorated.

If the protective film is applied on an article having color layer or printed image thereon, the reduction of the transparency leads the color or image to be invisible or difficult to visualize. It is therefore preferred that the protective film of the present invention has a light transmittance of not less than 80%, more preferably not less than 90%. The light transmittance used herein is determined by a method called as "light transmittance determining method" according to JIS K 7105.

The stain resistant protective film of the present invention has preferably a total thickness of 0.1 to 15 μm, more preferably 1 to 10 μm. A thickness of the surface layer (b) is not limited as long as the technical effects of the present invention are kept. For example, the surface layer (b) is formed into a thickness of 0.01 to 2 μm and it occupies 0.4 to 40% based on the total thickness.

It is also preferred that a surface water contact angle of the stain resistant protective film of the present invention is controlled to less than 70 degrees, more preferably not more than 65 degrees, during the initial use (within one after application), preferably during the initial use and thereafter. If the water contact angle is not more than 65 degrees, the protective film has excellent stain resistance and keeps it immediate after starting use.

The protective film of the present invention does not have lower limit in water contact angle in view of stain resistance. There, however, is a possibility that one adhesive sheet is piled on the protective film surface of the other adhesive sheet, and in this embodiment, it is preferred that a water contact angle of the surface of the protective film is kept not less than 35 degrees, in order to effectively prevent the reduction of water resistant adhesion of the adhesive sheet piled on.

The adhesive sheet of the present invention is composed of a substrate, an adhesive layer disposed on a back side of the substrate, and a protective film having hydrophilic surface as protective layer disposed on the other side of the substrate. The substrate generally contains a flexible polymer. Also, the substrate can either be single layer structure or be a laminate having two or more layers. The polymer used for the substrate includes acrylic polymer, polyolefin polymer, polyester polymer, polyurethane polymer, polyvinyl chloride polymer, silicone or the like. The substrate generally has a thickness of 20 to 20 μm, preferably 30 to 150 μm. The substrate may contain a colorant, such as pigment. The pigment may be contained in amount of 1 to 80% by weight based on a total weight of the substrate. The substrate may further contain an additive, such as ultraviolet absorber, heat stabilizer, plasticizer or the like as long as the technical effects of the present invention are not deteriorated.

The adhesive layer formed on the substrate can be one that has been used for conventional adhesive sheets. The adhesive layer can be pressure sensitive adhesive (self-adhesive), heat sensitive adhesive (e.g. hot melt adhesive) or solvent active type adhesive. The adhesive is preferably acrylic adhesive, in view of operability, processability and weather resistance. The adhesive may contain ultraviolet absorbent, heat stabilizer and the like, in order to enhance weather resistance. For enhancing adhesive power, there may be added crosslinking agent (curing agent), tackifier, or plasticizer. The adhesive preferably has an adhesive strength of 5 to 50 N/25 mn (180° peeling at 300 mm/min), if it is considered that the adhesive sheet is applied an article having deformation or roughness on its surface or an article having a curved surface.

In addition to the acrylic adhesive, the adhesive can be polyolefin, polyester, polyurethane, silicone (e.g. modified silicone, such as silicone polyurea), epoxy resin or the like. The adhesive layer may be formed from a coating solution containing the adhesive. A thickness of the adhesive layer is not limited, but generally within the range of 5 to 500 μm, preferably 10 to 300 μm.

In the case where an adhesive sheet is applied to an article used outside, such as a wall of a building or a sign board, there is a possibility that an adhesive sheet (a first adhesive sheet) is layered with another adhesive sheet (a second adhesive sheet). For example, the first adhesive sheet is applied on a surface of a sign board and then the second adhesive sheet that has been cut to an image or letters is applied thereon, to form an adhered structure. In this case, the second adhesive sheet may have sufficient adhesive power with the hydrophilic under layered surface in general conditions, but if the adhered structure is exposed to water, such as rain in a relatively long period of time, the adhesive strength between the surface of the protective film of the first adhesive sheet and the adhesive layer of the second adhesive sheet, that is water resistant adhesive strength, may be reduced. Preferably, the protective film has a water contact angle of not less than 35 degrees on the surface. In order to provide both stain resistance based on hydrophilic nature and reduction of water resistant adhesive power of the second sheet, it is more preferred that the protective film has a water contact angle of 40 to 64 degrees on the surface. The water contact angle is determined immediately after using the sheet.

In order to determine whether the protective film keeps the water contact angle within a predetermined range for a long period of time, it can be determined by an accelerated weather resistant test conducted by a sunshine WEATHER-O-METER™ (WOM). For example, it is preferred that the protective film of the present invention keeps the water contact angle within the above range after 500 hours test by the sunshine WEATHER-O-METER™. In addition, the protective film of the present invention preferably has a water contact angle, within the above range, even after the adhesive sheet before use is subjected to, an abrasion test conducted rotating 100 times with an H-22 abrasion ring at a 1 Kg load by a taper abrasion tester and then subjected to the accelerated weather test of 500 hours by the sunshine weather-o-meter. The water contact angle used herein is an angle determined by a contact angle meter to a water drop on a surface of the protective layer. The water for determination is purified water obtained by distilling ion-exchanged water.

The protective film of the present invention has a two layer structure composed of a base layer and a surface layer formed on the base layer, the base layer containing a hydrophilic stain resistant agent within the matrix and the surface layer containing another hydrophilic stain resistant agent on the periphery of the surface. Furthermore, the protective film may contain a combination of the surface-bleed type stain resistant agent and the inorganic oxide type stain resistant agent, while it not only contains the inorganic oxide type hydrophilic stain resistant agent within the matrix, but also contains the surface-bleed type hydrophilic stain resistant agent on the periphery of the surface.

During initial use (within one month after forming the film), hydrophilic nature of the surface is functional by the hydrophilic stain resistant agent present on the periphery of the surface. After using it and abrading out the surface of the protective layer, the hydrophilic nature of the surface is turned effective by the hydrophilic stain resistant agent present in the base layer. Accordingly, the stain resistance of the protective film of the present invention keeps and remains for a long period of time immediate after using. If the surface is kept hydrophilic, hydrophilic stain substance is once adhered on the surface, but it is washed or flowed away by natural cleaning function, such as rain or artificial water cleaning. On the other hand, lipophilic stain substance keeps away from the hydrophilic surface and does not adhere thereon. This function keeps the surface unstained for a long period of time.

Figure 2:
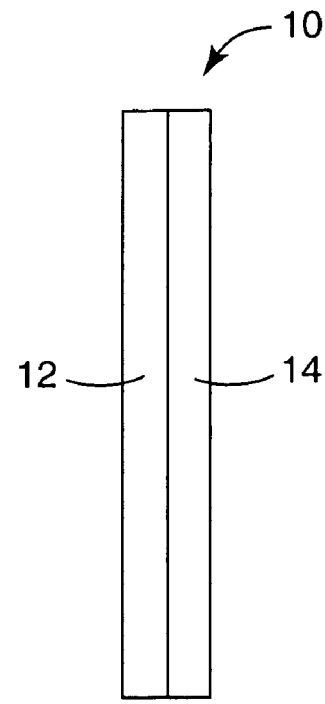
FIG. 2 is a cross sectional schematic diagram of a stain resistant protective film.
Figure 3:
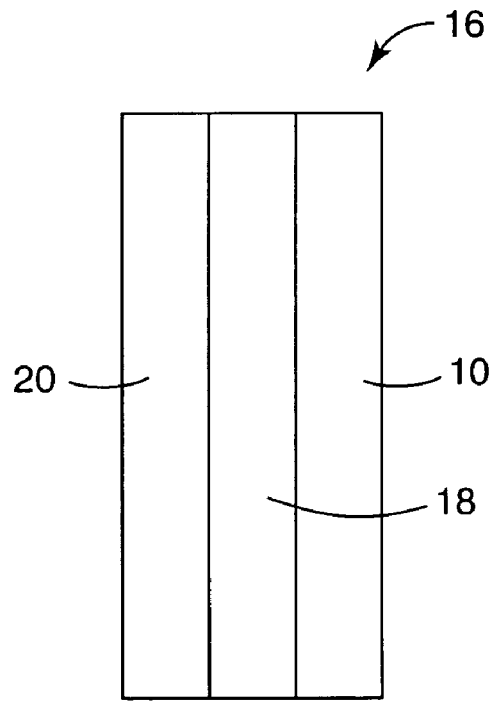
FIG. 3 is a cross sectional schematic diagram of an adhesive sheet.

FIG. 1 shows a stain resistant protective film 10. In FIG. 2, stain resistant protective film 10 includes a base layer 12 and a surface layer 14. FIG. 3 shows an adhesive sheet 16 that includes a substrate sheet 18, an adhesive layer 20 formed on one side of the substrate sheet 18 and a stain resistant protective film 10 (FIG. 1) formed on another side of the substrate sheet 18.

EXAMPLES

The present invention will be explained by the following Examples, which are, however, not construed as limiting the invention to their details.

Evaluation Methods

Water Contact Angle

On the surface of the protective layer of the adhesive sheet, water drop was fallen down, and a contact angle of water and the protective surface was determined by a contact angle meter available from Kyowa Kaimen Kagaku Co., Ltd. as CA-Z according to a manual attached to the machine. The water for determination was purified water obtained by distilling ion-exchanged water. The initial value was a value obtained from an adhesive sheet before use. The value after WOM 500 hours was one that was obtained after an accelerated weather test of 500 hours on the sheet before use according to JIS. The value after abrasion was a value that the adhesive sheet before use was subjected to an abrasion test conducted rotating 100 times with an H-22 abrasion ring at a 1 Kg load by a taper abrasion tester and then subjected to the accelerated weather test of 500 hours by the sunshine weather-o-meter.

Stain Resistance

The adhesive sheet was applied on an aluminum plate to form a sample and it was left outside for 6 months, followed by visually observing stain condition. For control sample, another sample was kept in room for 6 months and a comparison was made between the outside sample and the in-room sample. No stain was observed by eyes to indicate as Good and some stain was observed to indicate as NG.

Example 1

In this example, a SCOTCH™ film available from Sumitomo 3M Co. Ltd. as 3650 CF was used as a substrate having an adhesive layer for preparing an adhesive sheet. The substrate was formed from vinyl chloride film.

On the substrate, a base layer paint containing a first hydrophilic stain resistant agent was coated by a knife coater and dried at 120° C. for 3 minutes to form a base layer having a thickness of 3 μm adhered on the substrate surface.

The base layer paint was prepared by mixing a paint containing inorganic oxide hydrophilic stain resistant agent, available from Nippon Oil & Fat Co., Ltd. as Bell Clean Clear No. 5000 with a curing agent paint (containing polyfunctional isocyanate compound). A mixing ratio was 65:35 (weight ratio) of paint containing inorganic oxide stain resistant agent (non-volatile content of 46% by weight): curing agent paint (non-volatile content of 70% by weight). The paint containing inorganic oxide stain resistant agent was composed of acryl polyol resin and silica sol containing organosilicate compound (containing silan coupling agent carried on silica sol surface).

On the base layer obtained above, another paint containing the second hydrophilic stain resistant agent was coated, to form an adhesive sheet having a protective film thereon. The second paint was one containing organic silicon compound available from Nippon Oil & Fat Co., Ltd. as OX-011 and its film thickness was 0.1 μm. The second paint was dried at 100° C. for one minute.

The resulting adhesive sheet was subjected to a determination of an initial water contact angle and a water contact angle after abrading or weathering and the results are shown in Table 1.

Comparative Example 1

An adhesive sheet was prepared as generally described in Example 1, with exception that only a base layer containing inorganic oxide type stain resistant agent was formed and a surface layer was not formed. The resulting sheet was subjected to the same test and the results are shown in Table 1.

Comparative Example 2

An adhesive sheet was prepared as generally described in Example 1, with exception that a stain resistant protective film was only formed from a base layer not containing inorganic oxide type stain resistant agent. The resulting sheet was subjected to the same test and the results are shown in Table 1. The paint used herein contained the following ingredients:

| Paint Ingredients | Parts by weight |
| --- | --- |
| Acrylic polyol resin paint (Available from Nippon Shokubai Kagaku Kogyo Co., Ltd. as S-2818) | 81 (Non-volatile content = 60% by weight) |
| Hexamethylene isocyanate curing agent (Available from Sumitomo Bayer Urethane Co., Ltd. as Sumi-Jour N-75) | 17.0 (Non-volatile content = 75% by weight) |
| Surface-bleeding type hydrophilic stain resistant agent (Available from Daikin Industries, Ltd. as GH-100 | 2 |

Evaluation of the adhesive sheets obtained in Examples and Comparative Examples was conducted using the water contact angle and stain resistance procedure described above.

TABLE 1

| | | Ex. 1 | Comp. Ex. 1 | Comp. Ex. 2 |
| --- | --- | --- | --- | --- |
| Before abrasion test | Contact angle (initial) | 57.20 | 76.00 | 66.90 |
| | Contact angle after WOM 500 hours | 51.50 | 59.50 | 68.00 |
| | Stain resistance | Good | Good | Good |
| After abrasion test | Contact angle after WOM 500 hours | 61.70 | 63.10 | 82.50 |

Example 2

In this example, a SCOTCH™ film available from Sumitomo 3M Co. Ltd. as 3650 CF was used as a substrate having an adhesive layer for preparing an adhesive sheet. The substrate was formed from vinyl chloride film. On the substrate, a protective film paint was coated by a knife coater and dried at 120° C. for 3 minutes to form a protective film having thickness of 3 μm on the substrate surface, thus obtaining an adhesive sheet.

The protective film paint was prepared by mixing a paint containing inorganic oxide hydrophilic stain resistant agent, available from Nippon Oil & Fat Co., Ltd. as Bell Clean Clear No. 5000 with a surface-bleeding type hydrophilic stain resistant agent available from Daikin Industries, Ltd. as GH-100 and a curing agent paint (containing polyfunctional isocyanate compound). A mixing ratio was 65:2:35 (weight ratio) of paint containing inorganic oxide stain resistant agent (non-volatile content of 46% by weight): surface-bleeding type stain resistant agent (non-volatile content of 100% by weight): curing agent paint (non-volatile content of 70% by weight).

The paint containing inorganic oxide stain resistant agent was composed of acryl polyol resin and silica sol containing organosilicate compound (containing silan coupling agent carried on silica sol surface).

The resulting adhesive sheet was subjected to a determination of an initial water contact angle, a contact angle after weathering, a water contact angle after abrading and weathering, and an evaluation of stain resistance, and the results are shown in Table 2.

Comparative Example 3

An adhesive sheet was prepared as generally described in Example 2, with exception that the protective film paint did not contain the surface-bleeding type hydrophilic stain resistant agent. The resulting sheet was subjected to the same test and the results are shown in Table 1.

Comparative Example 4

An adhesive sheet was prepared as generally described in Example 2, with exception that the protective film paint did not contain the inorganic oxide type hydrophilic stain resistant agent. The resulting sheet was subjected to the same test and the results are shown in Table 2. The paint used in this example contained the following ingredients:

| Paint Ingredients | Parts by weight |
| --- | --- |
| Acrylic polyol resin paint (Available from Nippon Shokubai Kagaku Kogyo Co., Ltd. as S-2818) | 81 (Non-volatile content = 60% by weight) |
| Hexamethylene isocyanate curing agent (Available from Sumitomo Bayer Urethane Co., Ltd. as Sumi-Jour N-75) | 17.0 (Non-volatile content = 75% by weight) |
| Surface-bleeding type hydrophilic stain resistant agent (Available from Daikin Industries, Ltd. as GH-100 | 2 |

TABLE 2

|  |  | Ex. 2 | Comp. Ex. 3 | Comp. Ex. 4 |
| --- | --- | --- | --- | --- |
| Before abrasion test | Contact angle (initial) | 57.20 | 76.00 | 66.90 |
|  | Contact angle after WOM 500 hours | 51.50 | 59.50 | 68.00 |
|  | Stain resistance | Good | Good | Good |
| After abrasion test | Contact angle after WOM 500 hours | 61.70 | 63.10 | 82.50 |

Example 3

An adhesive sheet was prepared as generally described in Example 2, with exception that a mixing ratio of paint containing inorganic oxide stain resistant agent: surface-bleeding type stain resistant agent: curing agent paint (non-volatile content of 70% by weight) was changed to 81:2:17 (weight ratio). The resulting sheet was subjected to the same test and the results are shown in Table 3.

Example 4

An adhesive sheet was prepared as generally described in Example 2, with exception that a mixing ratio of paint containing inorganic oxide stain resistant agent: surface-bleeding type stain resistant agent: curing agent paint (non-volatile content of 70% by weight) was changed to 81:1:17 (weight ratio). The resulting sheet was subjected to the same test and the results are shown in Table 3.

Example 5

An adhesive sheet was prepared as generally described in Example 2, with exception that a mixing ratio of paint containing inorganic oxide stain resistant agent: surface-bleeding type stain resistant agent: curing agent paint (non-volatile content of 70% by weight) was changed to 81:5:17 (weight ratio). The resulting sheet was subjected to the same test and the results are shown in Table 3.

Example 6

An adhesive sheet was prepared as generally described in Example 2, with exception that the surface-bleeding type stain resistant agent was changed to a fluorine-containing silan compound available from Toagosei Chemical Industry Co., Ltd. as ZAFLON FC-2250™ and a mixing ratio of paint containing inorganic oxide stain resistant agent: surface-bleeding type stain resistant agent: curing agent paint (non-volatile content of 70% by weight) was changed to 81:3:17 (weight ratio). The resulting sheet was subjected to the same test and the results are shown in Table 2.

Example 7

An adhesive sheet was prepared as generally described in Example 1, with exception that the surface-bleeding type stain resistant agent was changed to a silicone oligomer available from Shin-Etsu Chemical Co., Ltd. as X-41-1053 and a mixing ratio of paint containing inorganic oxide stain resistant agent: surface-bleeding type stain resistant agent: curing agent paint (non-volatile content of 70% by weight) was changed to 81:20:17 (weight ratio). The resulting sheet was subjected to the same test and the results are shown in Table 3.

TABLE 3

|  |  | Ex. 3 | Ex. 4 | Ex. 5 | Ex. 6 | Ex. 7 |
| --- | --- | --- | --- | --- | --- | --- |
| Before abrasion test | Contact angle (initial) | 57.20 | 57.90 | 60.40 | 67.20 | 68.20 |
|  | Contact angle after WOM 500 hours | 51.50 | 57.10 | 58.90 | 62.00 | 63.70 |
|  | Stain resistance | Good | Good | Good | Good | Good |
| After abrasion test | Contact angle after WOM 500 hours | 61.50 | 51.50 | 56.50 | 64.80 | 72.30 |

What is claimed is:

1. A stain resistant protective film formed from a film-forming resin and containing a first hydrophilic stain resistant agent comprising an inorganic oxide type hydrophilic stain resistant agent and a second hydrophilic stain resistant agent comprising a surface-bleeding type stain resistance agent;

wherein the stain resistant protective film comprises:
(a) a base layer formed from a film-forming resin and containing the first hydrophilic stain resistant agent therein; and
(b) a surface layer containing not less than 60% by weight of the second hydrophilic stain resistant agent thereon, the surface layer formed on the base layer.

2. The stain resistant protective film according to claim 1, wherein the base layer (a) farther comprises an additional surface-bleeding type stain resistant agent.

3. The stain resistant protective film according to claim 2, wherein the additional surface-bleeding type stain resistant agent is present in the base layer (a) in an amount ranging from 0.3 to 30 parts by weight based on 100 parts by weight of the film-forming resin.

4. The stain resistant protective film according to claim 1, wherein the surface-bleeding type stain resistant agent is a compound having a chemical structure:

$$Y\text{—}O\text{—}R_f,$$

wherein
Y is a silicon-containing functional group which is hydrolysable to produce hydrophilic chemical species; and
$R_f$ is a fluorine-substituted hydrocarbon group wherein some or all of the hydrogen atoms are replaced with fluorine atoms, and the hydrocarbon group optionally contains oxygen or $R_f$ is an organic group that does not contain fluorine.

5. The stain resistant protective film according to claim 4, wherein Y is a siloxane group, a silylene group, a silane compound moiety, or a silicate moiety.

6. The stain resistant protective film according to claim 5, wherein the inorganic oxide type hydrophilic stain resistant agent is an organosilicate compound.

7. An adhesive sheet comprising a substrate sheet, an adhesive layer formed on one side of the substrate sheet, and the stain resistant protective film of claim 1 formed on another side of the substrate sheet.

8. The stain resistant protective film according to claim 7, wherein the substrate sheet is a single layer structure or a laminate of two or more layers.

9. The stain resistant protective film according to claim 7, wherein the adhesive layer is a pressure sensitive adhesive layer, a heat sensitive adhesive layer, or a solvent active adhesive layer.

10. The stain resistant protective film according to claim 1, wherein the surface-bleeding type hydrophilic stain resistant agent has a decomposable group that is decomposed by heat, light, or hydrolysis to produce a hydrophilic group.

11. The stain resistant protective film according to claim 1, wherein the surface-bleeding type stain resistant agent is a compound having a chemical structure:

$$Z\text{-}X\text{—}O\text{—}R_f,$$

wherein
Z is an organic group selected from a hydrocarbon group or a substituted hydrocarbon group which may contain silicon;
X is a carbonyl group or a sulfonyl group; and
$R_f$ is a fluorine-substituted hydrocarbon group wherein some or all of the hydrogen atoms are replaced with fluorine atoms, and the hydrocarbon group optionally contains oxygen or $R_f$ is an organic group that does not contain fluorine.

12. The stain resistant protective film according to claim 1, wherein the inorganic oxide type hydrophilic stain resistant agent is a silicate oxide containing compound, an organosilicate compound, an inorganic oxide sol, a silane oxide sol, an aluminum oxide sol, a zirconium oxide sol, or an antimony oxide sol.

13. The stain resistant protective film according to claim 1, wherein the film-forming resin is a non-curable film forming resin selected from acrylic resin, polyester resin, polyurethane resin, polyolefin resin, polyvinyl chloride, and silicone resin.

14. The stain resistant protective film according to claim 1, wherein the base layer (a) is formed from a layer of a curable film-forming resin containing the first hydrophilic stain resistant agent and the surface layer (b) is formed from a coating of a paint containing the second hydrophilic stain resistant agent and a solvent.

15. The stain resistant protective film according to claim 1, wherein the film has a total thickness of 0.1 to 15 μm.

16. The stain resistant protective film according to claim 1, wherein the surface layer (b) has a thickness of 0.01 to 2 μm and occupies 0.4 to 40% based on the total thickness of the film.

17. The stain resistant protective film according to claim 1, wherein the film has a water contact angle of not less than 35 degrees to less than 70 degrees when initially using.

* * * * *

UNITED STATES PATENT AND TRADEMARK OFFICE
CERTIFICATE OF CORRECTION

PATENT NO. : 7,341,789 B2
APPLICATION NO. : 10/486253
DATED : March 11, 2008
INVENTOR(S) : Tsuneyoshi Saitoh It is certified that error appears in the above-identified patent and that said Letters Patent is hereby corrected as shown below:

<u>On the Title Page Item (54),</u>
Line 1, Delete "PROTECTIVE" and insert -- PROTECT --, therefor.

<u>On the Title Page Item (57),</u>
Line 8, Delete "a-surface" and insert -- a surface --, therefor.

<u>Column 1,</u>
Line 1, Delete "PROTECTIVE" and insert -- PROTECT --, therefor.

<u>Column 2,</u>
Line 5, Before "a resin" delete "into".

<u>Column 3,</u>
Line 14, Delete "reason." and insert -- reason --, therefor.
Line 37 (approx.), Delete "FIGURES." and insert -- FIGURES --, therefor.

<u>Column 4,</u>
Line 23, After "surface" insert -- bleed --.
Line 53 (approx.), Delete "Z-X" and insert -- Z—X --, therefor.

<u>Column 5,</u>
Line 19 (approx.), Delete "Ltd. As" and insert -- Ltd. as --, therefor.

<u>Column 7,</u>
Line 50, Delete "mn" and insert -- nm --, therefor.

<u>Column 10,</u>
Line 38, After "GH-100" insert -- ) --.

<u>Column 11,</u>
Line 48, After "GH-100" insert -- ) --.

<u>Column 13,</u>
Line 12, In Claim 2, delete "farther" and insert -- further --, therefor.

UNITED STATES PATENT AND TRADEMARK OFFICE
CERTIFICATE OF CORRECTION

PATENT NO. : 7,341,789 B2
APPLICATION NO. : 10/486253
DATED : March 11, 2008
INVENTOR(S) : Tsuneyoshi Saitoh It is certified that error appears in the above-identified patent and that said Letters Patent is hereby corrected as shown below:

Column 14,
Line 9 (approx.), In Claim 11, delete "Z-X" and insert -- Z—X --, therefor.
Line 23, In Claim 12, delete "oxide containing" and insert -- oxide-containing --, therefor.

Signed and Sealed this

Fifth Day of August, 2008

JON W. DUDAS
*Director of the United States Patent and Trademark Office*